United States Patent [19]

Meyer et al.

[11] Patent Number: 4,711,708
[45] Date of Patent: Dec. 8, 1987

[54] CHEMICALLY MODIFIED ELECTRODES FOR THE CATALYTIC REDUCTION OF $CO_2$

[75] Inventors: Thomas J. Meyer; Terrence R. O'Toole, both of Chapel Hill, N.C.; Lawrence D. Margerum, Los Angeles; T. David Westmoreland, San Mateo, both of Calif.; William J. Vining, Racine, Wis.; Royce W. Murray; B. Patrick Sullivan, both of Chapel Hill, N.C.

[73] Assignee: Gas Research Institute, Chicago, Ill.

[21] Appl. No.: 917,383

[22] Filed: Oct. 9, 1986

[51] Int. Cl.$^4$ .......................... B01D 57/02; C25B 7/00
[52] U.S. Cl. .................................. 204/280; 204/59 R; 204/59 QM; 252/500; 427/58; 429/212; 429/213; 528/395
[58] Field of Search ............... 204/59 R, 59 QM, 280, 204/280 R; 252/500; 429/212, 213; 427/58; 528/395

[56] References Cited

U.S. PATENT DOCUMENTS

| | | | |
|---|---|---|---|
| 4,554,094 | 11/1985 | Bäbler et al. | 252/500 |
| 4,562,113 | 12/1985 | Yonohara | 204/280 |
| 4,603,118 | 7/1986 | Staab | 204/280 |
| 4,607,083 | 8/1986 | Muenstedt et al. | 204/59 R |
| 4,608,129 | 8/1986 | Tamamura et al. | 204/59 R |
| 4,608,132 | 8/1986 | Sammells et al. | 204/59 R |
| 4,608,133 | 8/1986 | Morduchowitz et al. | 204/59 R |
| 4,609,451 | 9/1986 | Sammells et al. | 204/59 R |
| 4,624,756 | 11/1986 | Matsuda et al. | 204/59 QM |

OTHER PUBLICATIONS

P. Denisevich, D. D. Abruna, C. R. Leidner, T. J. Meyer and R. W. Murray, Inorganic Chemistry, vol. 21, No. 6, 1982.
S. Cosnier, A. Deroznier and J. Moutet, J. Electroanal. Chem., 207 (1986), pp. 315–321.
A. I. Breikss and H. D. Abruna, "Electrochemical and Mechanistic Studies of (Re(CO)3(Dmbpy)Cl) and Their Relation to the Catalytic Reduction of $CO_2$", pp. 347–358.
J. Hawecker, J. Lehn and R. Ziessel, J. Chem. Socl, Chem. Commun., 1985, pp. 56–58.
T. R. O'Toole, L. D. Margerum, T. D. Westmoreland,
W. J. Vining, R. W. Murray and T. J. Meyer, J. Chem. Soc., Chem. Commun., 1985, pp. 1416–1417.
Inorg. Chem., 1985, 24, 987–988, "Improved Synthesis of 4-Vinyl-4'-methyl-2,2'-bipyridine".
C. M. Lieber and N. S. Lewis, J. Am. Chem. Soc. 1984, 106, 5033–5034 "Catalytic reduction of $CO_2$ at Carbon Electrodes . . . Phthalocyanine".
M. Wrighton and D. L. Morse, Journal of the American Chemical Society, 96:4, Feb. 20, 1974, pp. 998–1003.
B. P. Sullivan, and T. J. Meyer, "Photoinduced Irreversible Insertion of $CO_2$ into a Metal–Hydride Bond", Reprinted from J. of Chem. Soc. 1984.
J. Hawecker, J. Lehn and R. Ziessel, J. Chem. Soc., Chem. Commun., 1984, pp. 328–330.
B. P. Sullivan, C. M. Bolinger, D. Conrad, W. J. Vining, and T. J. Meyer, "One- and Two-Electron Pathways in the Electrocatalytic Reduction of $CO_2$ by fac--Re(bpy) $(CO)_3$Cl (bpy=2,2'-bipyridine)", Reprinted J. of Chem. Soc., 1985, pp.1414–1416.
J. Hawecker, J. Lehn and R. Ziessel, J. Chem. Soc., Chem. Commun., 1983, pp. 536–538.

Primary Examiner—Arthur P. Demers
Attorney, Agent, or Firm—Cushman, Darby & Cushman

[57] ABSTRACT

An electrode that has a film adsorbed to its surface by reductive electropolymerization of (vbpy)Re(CO)$_3$Cl (4-vinyl-4'-methyl-2,2'-bipyridine tricarbonylchlororhenium(I)) or its acetonitrile analogue, [(vbpy)Re(CO)$_3$(MeCN)]+ (4-vinyl-4'-methyl-2,2'-bipyridine tricarbonylacetonitrile rhenium (I)). The poly (vbpy)Re(CO)$_3$Cl or poly-[(vbpy)Re(CO)$_3$(MeCN)]+ adsorbed onto the electrode, acts as a catalyst for $CO_2$ reduction to CO. Stability and the reactivity of the polymer film may be increased by co-reductive electropolymeriaztion of either of the aforesaid Re complexes with [(bpy)$_2$Ru(vpy)$_2$$^{2+}$](bis(4-vinyl-pyridine)bis(2,2'-bipyridine) ruthenium (II)) (vpy is 4-vinylpyridine). A bilayer film assembly consisting of poly-[(bpy)$_2$Ru(vpy)$_2$]$^{2+}$as an inner film and the aforementioned copolymer of Ru/Re yields even greater reactivity to $CO_2$.

A method of forming a polymeric film on an electrode.

A method of reducing $CO_2$ to CO using an electrode having a polymeric film adsorbed to its surface.

12 Claims, 2 Drawing Figures

CHEMICALLY MODIFIED ELECTRODES FOR THE CATALYTIC REDUCTION OF $CO_2$

BACKGROUND AND SUMMARY OF THE INVENTION

The present invention relates to certain novel electrodes and their use for electrocatalytically reducing carbon dioxide to carbon monoxide.

Broadly described, the invention comprises an electrode that has a film adsorbed to its surface by reductive electropolymerization of $(vbpy)Re(CO)_3Cl$ (4-vinyl-4'-methyl-2,2'-bipyridine tricarbonychlororhenium(I)) or its acentonitrile analogue, $[(vbpy)Re(CO)_3(MeCN)]^+$ (4-vinyl-4'-methyl-2,2'-bipyridine tricarbonylacentonitrile rhenium (I)). The poly$(vbpy)Re(CO)_3Cl$ or poly-$[(vbpy)Re(CO)_3(MeCN)]^+$ adsorbed onto the electrode, acts as a catalyst for $CO_2$ reduction to CO. Stability and the reactivity of the polymer film may be increased by co-reductive electropolymerization of either of the aforesaid Re complexes with $[(bpy)_2Ru(vpy)_2{}^{2+}]$(bis(4-vinyl-pyridine)bis(2,2'-bipyridine) ruthenium (II)) (vpy is 4-vinylpyridine). A bilayer film assembly consisting of poly-$[(bpy)_2Ru(vpy)_2]^{2+}$ as an inner film and the aforementioned copolymer of Ru/Re as an outer layer yields even greater reactivity of $CO_2$.

Studies have shown that a system based on $Re(bpy)(CO)_3Cl$ (bpy=2,2'-bipyridine) photocatalytically reduces $CO_2$. Further studies have shown that $Re(bpy)(CO)_2X(X=Cl^-, MeCN)$ and a variety of other complexes, electrocatalytically reduce $CO_2$ at moderate overvoltages. Work on the thermal and photochemical reactivity of $Re^1(bpy)(CO)_3L(L=H^-, D^-)$ has provided insight into the mechanism of $CO_2$ insertion into the Re-H or Re-D bond.

Electrochemically-initiated polymerization of metal complexes of 4-vinyl-4'-methyl-2,2'-bipyridine (vbpy) groups is a versatile technique to form chemically active polymeric films on electrodes. Chemically modified electrodes for electrocatalysis have potential advantages over homogeneous systems in that only small amounts of catalyst are necessary for efficient electrolysis, and enhanced reactivities might be realized by blocking normal solution deactivation pathways.

According to one embodiment of the present invention, carbon dioxide is reduced by potentiostating a Pt or glassy carbon electrode having a Re complex polymeric film, at $\leq -1.4$ V versus a saturated sodium chloride calomel electrode in $CO_2$ saturated acetonitrile and 0.05-2.0 M electrolyte, for example, tetraethylammonium perchlorate or tetrabutylammonium electrolyte. The process is "catalytic" in that each rhenium site reduces many $CO_2$ molecules and does so at 85-95% faradaic efficiency but most commonly at 92%, and a potential almost 1 V more positive than, for example, a bare Pt electrode (i.e., at this potential the bare electrode is incapable of reducing $CO_2$) and is thus more energy efficient than a bare electrode.

According to a second embodiment of the present invention, $CO_2$ is reduced to CO using an electrode as in the first embodiment, however, the polymer film is a copolymer resulting from coreductive electropolymerization of $(vbpy)Re(CO)_3Cl$ or $[(vbpy)Re(CO)_3(MeCN)]^+$ with $[(bpy)_2Ru(vpy)_2]^{2+}$. This copolymer film has increased stability and reactivity toward $CO_2$.

According to a third embodiment of the present invention, $CO_2$ is reduced to CO using an electrode as in the first embodiment, however, the polymer film is not a single layer but is a twolayer assembly where the inner layer is composed of poly-$[(bpy)_2Ru(vpy)_2]^{2+}$ and the outer layer is the Ru/Re copolymer of the second embodiment.

BRIEF DESCRIPTION OF THE DRAWINGS

Further objects and advantages of the present invention will be better understood by carefully reading the following detailed description of the presently preferred embodiments of this invention in conjunction with the accompanying drawings, of which.

DETAILED DESCRIPTION OF THE INVENTION

The present invention provides in one of its broadest aspects, several electropolymerised complexes and combinations of these complexes, for example, $Re(vbpy)(CO)_3 CL^+$ or $[(vbpy)Re(CO)_3(MeCN)]^+$ or $[(bpy)_2Ru(vpy)_2{}^{2+}]$ to yield electroactive films on electrodes, for example, platinum or glassy carbon electrodes, for the efficient reduction of $CO_2$ to CO. The constituent, vbpy, was synthesized via a modification of the method of Abruna et al (H. D. Abruna, A. I. Breikss, and D. B. Collum, *Inorg. Chem.*, 1985 24, 988) to provide a reliable, relatively easily obtainable, high quality product.

The complex $Re(vbpy)(CO)_3 Cl$ was synthesized by heating vbpy (1 equiv.) with $Re(CO)_3Cl$ (1 equiv. Pressure Chemical Co.) at reflux in pentane for 5 h. The yellow complex was filtered out of the solution in essentially quantitative yield and was used without further purification.

The complex $[(vbpy)Re(CO)_3(MeCN)]^+$ was synthesized by the following procedure. To 40 ml of deaerated diethyl ether were added 0.12 g of $(vbpy)Re(CO)_3Cl$ and 0.12 g $Ag(CF_3SO_3)$ (about 1:2 mole ratio). The slurry was stirred for ½ hour at room temperature. To the mixture was added 20 ml of acetonitrile to yield a homogeneous solution. After 20 minutes the solution glowed green, indicative of the MeCN complex. The precipitated AgCl was filtered off after 1½ hours and the volume of the filtrate was reduced to about 5 ml. Approximately 0.3 g of TBAH was added to 3 ml of $CH_2Cl_2$ and the resulting solution filtered to collect the $PF_6{}^-$ salt $[(byp)Re(CO)_3(CH_3CN)](PF_6)$ which was purified by chromatography on alumina. The complex $(bpy)Re(CO)_3Cl$ was eluted first by $CH_2Cl_2$ elution and the acetonitrile salt by elution using a 1/1 ratio of $CH_2Cl_2/MeCN$.

Films based on poly-$[(vbpy)Re(CO)_3(MeCN)]^+$ on Pt and glassy carbon electrodes had properties toward $CO_2$ reduction which were closely related to films based on $(vbpy)Re(CO)_3Cl$ based on turnover numbers and faradaic efficiency with regard to CO production (85-95%).

Tests show the formation of an electropolymerized film on a Pt electrode which is a $CO_2$ saturated MeCN-electrolyte, leads to the formation of CO at an overall current efficiency of, for example, 92%.

Figure 1:
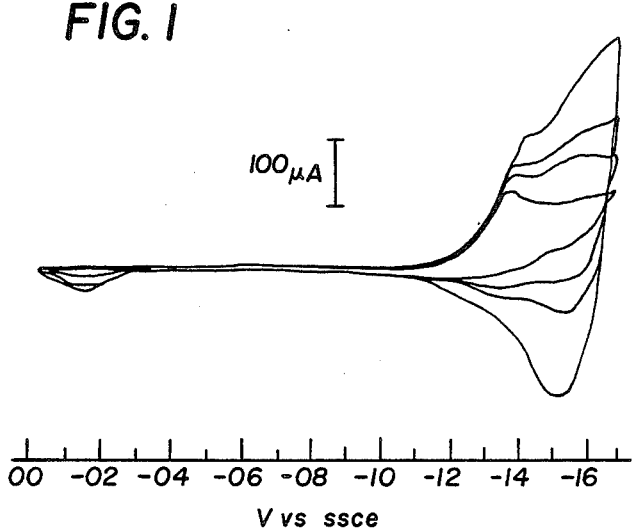
FIG. 1 shows the course of an electropolymerization reaction carried out by cycling the potential of a Pt disc electrode between 0.00 and $-1.70$ V vs. saturated sodium calomel electrode (s.s.c.e.) in an MeCN solution.

FIG. 1 shows the course of an electropolymerization reaction carried out by cycling the potential of a Pt disc electrode between 0.00 and −1.70 V at 200 mV/sec (but may be 100–500 mV/sec) versus a saturated sodium calomel electrode (s.s.c.e.) in an MeCN solution which was (typically) 0.1 M in electrolyte ($Bu_4NPF_6$ or $Et_4NClO_4$) and 2 mM in $Re(vbpy)(CO)_3Cl$. The voltammetry shows a reductive wave which is localized on the bipyridine ligand followed by a second wave which is metalbased as shown from studies on a variety of $Re^1(bpy)(CO)_3L$ complexes. Subsequent potential scans show enhanced currents indicative of formation of a polymeric film which can be charged and discharged and which can further reduce reactive monomers. Removal of the electrode from the polymerizing solution and rinsing with MeCN reveals a greenish-gold film which, upon standing in air, becomes yellow.

Figure 2:
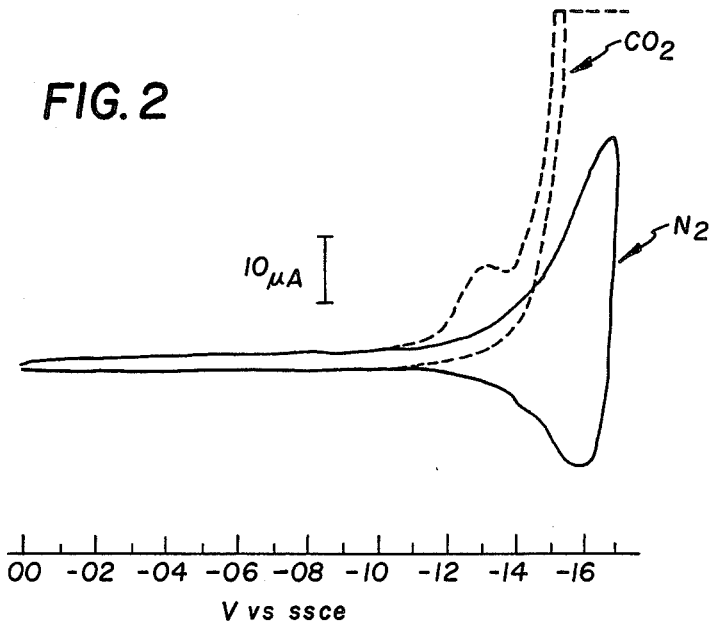
FIG. 2 shows a typical cyclic voltammogram (c.v.) of the film tested in FIG. 1 when placed in fresh MeCN-electrolyte solution.

A typical cyclic voltammogram (c.v.) of the yellow film in fresh MeCN-electrolyte solution is shown in FIG. 2. There are no distinct reversible reductive waves, and so coverage of polymerized complex was estimated from the final voltammetric scan of the electropolymerization. Since $Re(bpy)(CO)_3Cl$ undergoes $Cl^-$ loss (albiet slowly) upon reduction at the first wave with formation of a metal-metal bonded dimer, it might be expected that the electropolymerized polymer is either the MeCN complex or is the dimer. It is not possible to determine electrochemically whether this is the case. The oxidation feature appearing at 0.15 V during the electropolymerization in FIG. 1 is characteristic of the reoxidation of the Re-Re bonded dimer. The initial green colour of the electropolymerized film is thought to be due to residual amounts of this dimer, which decomposes to a monomer in air. X-Ray photoelectron spectral data collected on a film, electropolymerized in $Bu_4NPF_6$ on the Pt flag electrode show only a small amount of F present; the MeCN complex would have $PF_6^-$ as a counterion. In addition, u.v.-visible spectra obtained from a film on a NaCl plate sputter-coated with an optically transparent film of Pt gave λ291 and 380 nm. indicative of $Re(bpy)(CO)_3X$ (X=anion). While not conclusive, these results are consistent with most of the metal sites in the film as having retained the $Cl^-$ ligand.

The electrocatalysis test shown in FIG. 2 is typical of the behaviour of films deposited on Pt electrodes. The c.v. in $N_2$-saturated MeCN-electrolyte is contrasted with the c.v. of the same electrode after the solution has been purged with $CO_2$ for 5 min. The observed current enhancement (dashed line) is characteristic of such electrocatalytic systems. Tests using modified rotating disc electrodes show that the currents do not depend on electrode rotation rate. This is plausible given that $CO_2$ is very soluble in MeCN and has a high diffusion coefficient. The result suggests that $CO_2$ permeates the film rapidly and that its mass transport is not rate-limiting in the catalysis.

In order to characterize the gaseous products and the efficiency of the catalysis, $Re(bypy)(CO)_3Cl$ was electropolymerized onto, for example, a platinum gauze electrode. An upper limit on the total amount of electroactive material on this electrode was estimated to be $5 \times 10^{-7}$ mol (from the integrated current under the last voltammetric scan of the polymerization). The electrode was placed in a gas-tight cell in MeCN—$Bu_4NPF_6$ saturated with $CO_2$. Potentiostating the electrode at −1.55 V (generally, ≦−1.4 v) versus a saturated sodium calomel electrode (s.s.c.e.) for 80 min. led to the formation of 6.3 ml of CO at an overall current efficiency of 92.3% (as measured by gas chromatograph and coulometry). Based on the estimated amount of catalyst in the polymer, this represents 516 turnovers as compared to 20–30 turnovers in 80 min. for an electrocatalysis test performed with the corresponding monomer in solution and at the same electrode potential. In both electrolyses the current had decayed to a small value after 80 min. c.v.'s after the modified electrode experiment was completed showed that the electroactive material was lost from the surface.

There are at least two differences in the 80 min. electrolysis experiments with electropolymerized $Re(vbpy)(CO)_3Cl$ and with a $Re(bpy)(CO)_3Cl$ solution. First, the electropolymerized catalyst executed 20–30 times more turnovers per site (at a minimum). Secondly, no $CO_3^{2-}$ product was observed with electropolymerized $Re(vbpy)(CO)_3Cl$ whereas equal amounts of CO and $CO_3^{2-}$ were produced in the solution test for electrolysis at −1.55 V. Conducting the electrocatalytic reaction in the polymerized medium apparently enhances an alternate more reactive pathway and may also stabilise the catalyst toward decomposition.

The second embodiment includes a copolymer film. Polymer films that show an increase in stability and reactivity toward $CO_2$ reduction are formed by co-reductive electropolymerization of either of the Re complexes cited with $[(bpy)_2Ru(vpy)_2]^{2+}$ (vpy is 4-vinylpyridine). This co-reductive electropolymerization is performed by cycling the applied potential from 0.0 to −1.7V at 200 mV/sec (but may be 100–500 mV/sec) in 0.1M (may be 0.05M–2.0M) TBAH/MeCN, in solutions containing approximately 20–40% (preferably about 30%) of Re/RU complexes. Electropolymerized films based on $[(bpy)_2Ru(vpy)_2]^{2+}$ show no or very low reactivity toward reduction of $CO_2$ at potentials to −1.7 volts. Turnover numbers for the two electron reduction products for the catalytic sites in the copolymers are 1,300–2,500 (typically 2,000) as compared to 150–700 (typically 400) for films based on $[(vbpy)Re(CO)_3X]$. The useful catalytic lifetime of these copolymers is about double that of the poly-$[(vbpy)Re(CO)_3X]$ indicating a greater stability which accounts for some of the turnover number increase. An enhanced catalytic activity must account for the rest.

There are several possible reasons for the enhanced stability and reactivity in the Re-Ru based films. They offer the extra crosslinking provided by the $[(bpy)_2Ru(vpy)_2]^{2+}$ ion which has two polymerizable groups giving a polymer with greater physical strength. The addition of ionic $[(byp)_2Ru(vpy)_2]^{2+}$ sites leads to a high permeability toward ion flow which is required for charge compensation when electron flow occurs into the film from the electrode. Since the pure Re-based films are initially neutral there may be an inhibition to ion flow. Electron transfer between reduced $[(bpy)_2Ru(vpy)_2]_{2+}$ sites in the film is facile and the Ru sites act as potential electron reservoirs for the catalytic Re sites.

The first reductions of $(bpy)Re(CO)_3Cl$ (−1.32 V) or of $[(bpy)Re(CO)_3(MeCN)]^+$ (−1.21 V) are facile but their second reductions are kinetically slow and the $[(bpy)_2Ru(vpy)_2]^{2+}$ sites, present in excess, may be effective at delivering electrons on demand throughout the film.

A third embodiment includes a bilayer assembly having poly-$[(bpy)_2Ru(vpy)_2]^{2+}$ as an inner film with a 20–40% copolymer of Ru/Re complexes as the outer film. This yields even higher equivalent turnover numbers of 3,000–5,000 (typically 3,700) due largely to an enhanced stability.

Other modifications of the present invention will also be evident to those in the art on the basis of the foregoing description. Furthermore, the invention may comprise, consist, or consist essentially of the sequences and materials recited herein.

What is claimed is:

1. An electrode comprising a polymeric film adsorbed to said electrode, said film being formed by electropolymerization of (vbpy)Re(CO)$_3$Cl or [(vbpy)Re(CO)$_3$(MeCN)]$^+$, said film acting as an electrocatalyst for reducing $CO_2$ to CO within a solution.

2. The electrode of claim 1 wherein said electrode is formed of platinum.

3. The electrode of claim 1 wherein said electrode is formed of glassy carbon.

4. The electrode of claim 1 wherein said polymeric film is electrically charged and discharged.

5. The electrode of claim 1 wherein said polymeric film reduces reactive monomers.

6. The electrode of claim 1 wherein the mass transport of said $CO_2$ through said polymeric film is not rate-limiting in the catalysis.

7. The electrode of claim 1 wherein the reduction of $CO_2$ to CO occurs at an overall current efficiency is between 85–95%.

8. The electrode of claim 1 wherein said electrocatalytic reaction occurs in a polymerized medium enhancing a more reactive catalytic pathway and stabilizing the catalyst toward decomposition.

9. The electrode of claim 1 wherein said solution is MeCN-electrolyte.

10. The electrode of claim 9 wherein said electrolyte is Bu$_4$NPF$_6$ or Et$_4$NClO$_2$.

11. The electrode of claim 1 wherein said (vbpy)Re(CO)$_3$Cl or [(vbpy)Re(CO)$_3$(MeCN)]$^+$ is copolymerized with [(bpy)$_2$Ru(vpy)$_2$]$^{2+}$, resulting in a co-polymeric film having increased stability and reactivity toward $CO_2$.

12. An electrode comprising a bilayer polymeric film adsorbed to said electrode, said bilayer polymeric film including, an inner layer of poly-[(bpy)$_2$Ru(vpy)$_2$]$^{2+}$, and
an outer layer of copolymer resulting from copolymerization of (vbpy)Re(CO)$_3$Cl or [(vbpy)Re(CO)$_3$(MeCN)]$^+$ with [(bpy)$_2$Ru(vpy)$_2$]$^{2+}$.

* * * * *